United States Patent [19]
Nogami et al.

[11] Patent Number: 5,276,670
[45] Date of Patent: Jan. 4, 1994

[54] PHASE CHANGE OPTICAL DISK AND METHOD FOR USING THE SAME

[75] Inventors: Hiroshi Nogami; Masaji Ishigaki, both of Yokohama; Norio Goto, Tokyo; Makoto Miyamoto, Yokohama; Yukio Fukui, Tokyo, all of Japan

[73] Assignee: Hitachi, Ltd., Tokyo, Japan

[21] Appl. No.: 480,641

[22] Filed: Feb. 15, 1990

[30] Foreign Application Priority Data

Feb. 17, 1989 [JP] Japan ................... 1-036141

[51] Int. Cl.$^5$ .............................. G11B 11/12
[52] U.S. Cl. .................... 369/116; 369/100; 360/114
[58] Field of Search ............ 369/272, 275.1, 275.2, 369/280, 116, 100; 360/114, 73.08, 73.02; 430/945, 495, 19; 346/135.1, 76

[56] References Cited

U.S. PATENT DOCUMENTS 5,128,910 7/1992 Iida .......................... 360/64

Primary Examiner—Paul M. Dzierzynski
Assistant Examiner—Don Wong
Attorney, Agent, or Firm—Antonelli, Terry, Stout & Kraus

[57] ABSTRACT

A phase change optical disk in which the thermal conductivity of a first region at an outer peripheral position of the disk is set at a value larger than the minimum value of that of a second region. In the optical disk, in order to provide an output characteristic of a uniform reproduced signal when the disk is rotated at a fixed rotation speed, toward an outer peripheral position thereof, the critical cooling rate of a recording film is set at a larger value or the temperature which the recording film is to reach is set at a lower value. Provided is a method of using the phase change optical disk for recording or erasing information, in which method, the power of the laser beam to be directed to an inner peripheral position of the disk is set larger than that directed to an outer peripheral position thereof.

5 Claims, 15 Drawing Sheets

F I G. 22
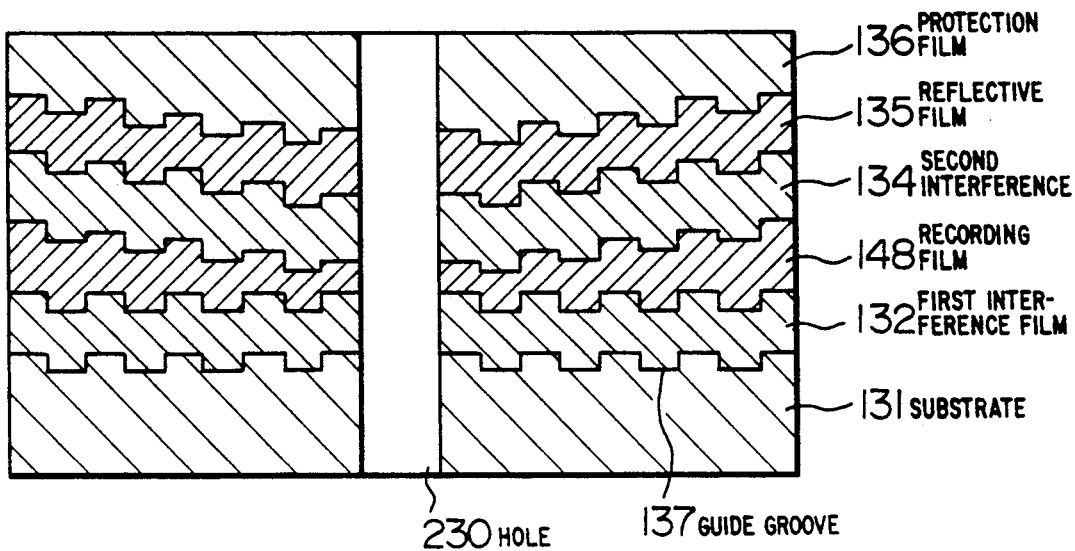
F I G. 23
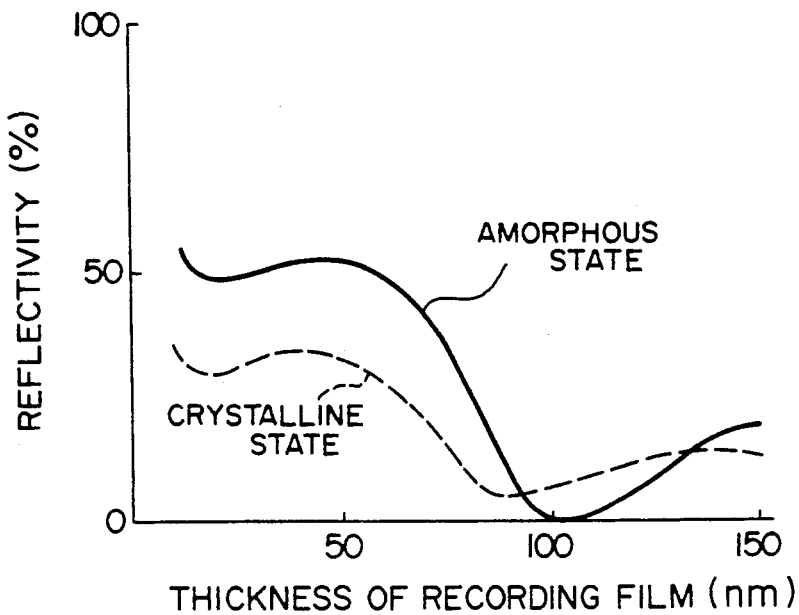

178 OPTICAL DISK
176 PROTECTION FILM
175 REFLECTIVE FILM
174 SECOND INTERFERENCE FILM
173 RECORDING FILM
172 FIRST INTERFERENCE FILM
171 SUBSTRATE
430 HOLE
177 GUIDE GROOVE

188 OPTICAL DISK
186 PROTECTION FILM
185 REFLECTIVE FILM
184 SECOND INTERFERENCE FILM
183 RECORDING FILM
182 FIRST INTERFERENCE FILM
181 SUBSTRATE
530 HOLE
187 GUIDE GROOVE

PHASE CHANGE OPTICAL DISK AND METHOD FOR USING THE SAME

BACKGROUND OF THE INVENTION

The present invention relates to a phase change optical disk suited to carry out overwrite using a single beam (referred to as "single beam overwrite") and a method for using the optical disk. More particularly, the present invention relates to a phase change optical disk which can provide a uniform reproduction output characteristic at positions on inner and outer sides thereof, and a recording for erasing method therefor.

Generally, the phase change optical disk utilizes a change in the optical property of a recording film used, which occurs owing to the phase state change thereof, to record and erase information; the phase state of the recording film in the optical disk corresponds to the process of heating and subsequent cooling (radiation) of the recording (or erasing) position of the recording film by laser beam irradiation. On the other hand, it has been demanded in the technical field of the phase change optical disk that the single beam overwrite technique, which can erase recorded information and also record new information by only irradiating the optical disk with a single laser beam with modulated power (i.e. modulated amplitude in light intensity), can be put into practice. The single beam overwrite in the phase change optical disk is disclosed in for example, the technical report in DENSHI JOHO TSUSIN GAKKAI, (The Institute of Electronics, Information and Communication Engineers of Japan) CMP 87-88, 89, 90 (1987).

A vertical structure of such a conventional optical disk 58 is shown in FIG. 1. In FIG. 1, 51 is a disk-shape PC (polycarbonate) substrate. Formed on the substrate 51 is a recording film 53 made of antimony (Sb), selenium (Se) and bismuth (Bi) which is 120 nm thick. Further formed on the recording film 53 is a protection film 56 made of an ultraviolet ray setting resin. Incidentally, 30 is a hole centrally provided on the principal surface of the optical disk 58.

In carrying out the single beam overwrite, the phase change optical disk 58 is irradiated with a laser beam having a modulated irradiation power P as shown in FIG. 2. In FIG. 2, the level of recording information is at a high power Pw, and the level of erasing information is at an erasing power Pe which is lower than Pw. Such modulated irradiation power erases the previous information recorded on the optical disk and also records new information. The level of reproducing information which is at the lowest power Po is used to reproduce the recorded (or erased) information to provide a reproduced signal.

In case of the prior art, when the number of rotations of the optical disk 58 is fixed, and the single beam overwrite is carried out, the ratio of a carrier level to random noise (referred to as "CNR") during the irradiation of the laser beam with the same power is lower at the outer position of the disk where the linear velocity on the recording surface (principal surface) of the optical disk 58 is higher. The linear velocity v is defined as $$v = 2\pi r N / 60$$

where r indicates the radius of disk and N indicates the rotation number (rpm). On the other hand, cross-talk is less at the outer position. This is because the irradiation density of the irradiation power P of the laser beam is lower at the outer position, more specifically because the width over which information is recorded on a certain track (not shown) of the optical disk 58 is narrower at the outer position. Therefore, in order to provide the output characteristic of a substantially uniform reproduced signal at both inner and outer positions, a larger irradiation power P is required at the outer position. However, since an available output level from a semiconductor device (laser diode) has a limit, sufficient irradiation power P could not be obtained.

Additionally, if the number of rotations (rotation speed) of the optical disk 58 is suitably set so as to fix the linear velocity thereof, the above problem does not occur. In this case, however, a motor used is required to vary the number of rotations in accordance with the radial position of the optical disk where an optical head is positioned. This makes it difficult to carry out high speed random access which is a great feature of the optical disk in its use, so that the above fixing of the linear velocity can not be actually adopted.

Furthermore, there has been proposed the related art as disclosed in U.S. patent application Ser. No. 362699 filed on Jun. 7, 1989 and U.S. patent application Ser. No. 366,873 filed in Jun. of 1989 both assigned to the present assignee. The single beam overwrite in this related art will be explained briefly. FIG. 3 shows a vertical arrangement of the optical disk on the related art. In an optical disk 68 shown in FIG. 3, formed on a glass substrate 61 is a recording film 63 made of indium (In), antimony (Sb) and tellurium (Te), which is about 30 nm. Formed on the recording film 63 is an interference film 64 of $Si_3N_4$ which is about 70 nm thick. Formed on the interference film 64 is a reflective film 65 of gold (Au). Finally formed on the reflective film 65 is a protection film 66 of $Si_3N_4$. A numeral 30 is a hole centrally provided on the principal surface of the optical disk. The optical disk 68 is irradiated with a laser beam 9 from its bottom surface.

The characteristic of the optical disk in the case where the disk is irradiated with the laser beam converged in about 1 μm while it is rotated will be explained.

FIG. 4 shows the relation between the temperature T of the recording film reached when the recording film 63 at a recording position (or erasing position) is heated at temperatures above its melting point and the cooling rate Cs of the recording film when it passes a crystallization temperature zone, over which the crystallization of the recording film 63 is promoted, in the cooling process after having been melted; the cooling rate is measured in terms of the temperature lowered during unit time. As indicated by a solid line, the cooling rate Cs of the recording film 63 increases as its temperature rises.

if the recording film 63, after melted, is cooled at a sufficiently high cooling rate Cs, it will be made amorphous; otherwise it will be made crystalline. The minimum cooling rate Cs required for the recording film to become amorphous is the critical cooling rate thereof.

Now it is assumed that the critical cooling rate of the recording film has been set at a value Csc indicated by a broken line in FIG. 4. (The critical cooling rate can be set optionally set by changing the components and/or composition of the recording film). If the recording film 63 is heated to temperatures above the critical temperature Tc decided a point of intersection of the solid line and broken line, the cooling rate of Cs will exceed the critical cooling rate so that the recording film 63 at a recording position, after melted, will be made amorphous, i.e. placed in the recording state.

On the other hand, if the recording film 63 is only melted to a temperature T in the range from the melting point Tm to the critical temperature Tc, the cooling rate Cs will become lower than the critical cooling rate Csc so that the recording film 63 at the recording position, after melted, will be crystalline, i.e. placed in the erasing state. It should be noted that even if the temperature of the recording film does not reach the melting point Tm, the crystallization thereof will proceed as long as the temperature is higher than a glass transformation temperature Tg.

The temperature T of the recording film 63 can be controlled by the irradiation power P of the laser beam 9 so that the recording and erasing can be easily realized by only controlling the irradiation power P. Thus, the single beam overwrite can be also realized.

The above recording/erasing method (generally referred to as "melt-erasing method") once melts the recording film regardless of recording and erasing so that it can reduce incomplete erasure of information as compared with the conventional technique of erasure by crystallization from the solid phase, thereby providing high erasability and a high CNR.

Thus, the basic principle of one example of the single beam overwrite has been explained in connection with the relation between the temperature T of a recording film and the cooling rate Cs thereof.

SUMMARY OF THE INVENTION

An object of the present invention is to provide a phase change optical disk which does not require higher irradiation power at its outer peripheral position than that at its inner peripheral position, i.e. does not provide reduced recording sensitivity (or erasing sensitivity) at a position with a higher linear velocity more specifically to provide a phase change optical disk which can provide an output characteristic of a uniform reproduction signal by the same irradiation power at both inner and outer peripheral positions.

Another object of the present invention is to provide a recording and/or erasing method of using the above phase change optical disk which can make uniform, at both inner and outer peripheral positions of the disk rotating at a fixed rotary speed, the output characteristic of the reproduction signal in single beam overwrite using the disk.

A recording film is liable to become amorphous as its cooling rate Cs after having been melted is high. Then, in order to attain the first-mentioned object, the phase change optical disk according to the present invention is structured such that the cooling rate Cs of the recording film after having been melted is lower at a position with a higher linear velocity.

Otherwise, in order to attain the first-mentioned object, in accordance with the present invention, the critical cooling rate Csc of the recording film in a first region located on an outer peripheral side of the disk is set to be higher than that in a second region on an inner peripheral side thereof; where the critical cooling rate Csc is the minimum cooling rate required for the recording film of a phase change optical disk to become amorphous after having been melted.

Moreover, in order to effectively attain the first-mentioned object, in accordance with the present invention, the thermal conductivity of the recording film of a phase change optical disk is set so as to be higher in a first region on an outer peripheral side of the disk than in a second region on an inner peripheral side thereof.

Furthermore, in order to effectively attain the first object, in accordance with the present invention, the thickness of the recording film of a phase change optical disk is set so as to be larger in a first region on an outer peripheral side of the disk than in a second region on an inner peripheral side thereof.

Further, in order to effectively attain the first object, in accordance with the present invention, in a phase change optical disk having a reflective layer of a metallic film provided on the side opposite to the side irradiated with a laser beam with respect to a recording film, the thermal conductivity of the reflective film is set so as to be higher in a first region on an outer peripheral side of the disk than in a second region on an inner peripheral side thereof.

Further, in order to effectively attain the first-mentioned object, in accordance with the present invention, in a phase change optical disk having a reflective layer of a metallic film provided on the side opposite to the side irradiated with a laser beam with respect to a recording film, the thickness of the above reflective film is set so as to be larger in a first region on an outer peripheral side of the disk than in a second region on an inner peripheral side thereof.

Further, in order to effectively attain the first object, in accordance with the present invention, in a phase change optical disk having a dielectric layer arranged between a recording film and a reflective layer of a metallic film provided on the side opposite to the side irradiated with a laser beam with respect to the recording film, the thermal conductivity of the dielectric layer is set so as to be higher in a first region on an outer peripheral side of the disk than in a second region on an inner peripheral side thereof.

Further, in order to effectively attain the above object, in accordance with the present invention, in a phase change optical disk having a dielectric layer arranged between a recording film and a reflective layer of a metallic film provided on the side opposite to the side irradiated with a laser beam with respect to the recording film, the thickness of the above dielectric layer is set so as to be smaller in a first region on an outer peripheral side of the disk than in a second region on an inner peripheral side thereof.

On the other hand, in order to attain the another object, in accordance with the present invention, in recording and/or erasing for a phase change optical disk, irradiation power is set so as to be lower in a first region on an outer peripheral side of the disk than in a second region on an inner peripheral side thereof.

Now, in connection with the phase change optical disk suited for the melt-erasing method related art), explanation will be given for the dependency of recording signals on the linear velocity of the disk and on the temperature of a recording film in a track traversing direction, which have been studied by inventors of the present invention.

FIG. 5 shows the relation between the temperature T of the recording film at a recording position and a cooling rate Cs when the linear velocity is used as a parameter. In the structure of the optical disk as shown in FIG. 3, the cooling rate Cs of the recording film 63 increases with increasing linear velocity. Therefore, with the same temperature T of the recording film, a higher cooling rate is provided at an outer peripheral position of the disk. The reason is as follows.

The recording film 63 has a small thermal capacity because it is as thin as 30 nm, so that heat generated owing to the irradiation of a laser beam 9 is easily absorbed in the reflective film 65 of Au having a high thermal conductivity through the interference film 64. Thus, the heat is not stuffy in the recording film 63 at a recording position; therefore, the temperature change of the recording film 63 will be decided by the processing process of the laser beam 9. As a result, the higher cooling rate Cs of the recording film 63 is obtained at an outer peripheral position where the laser beam passes at a higher speed.

FIG. 6 shows the distribution of the temperature of a recording film in a track traversing direction (radial direction of the disk) when a linear velocity v is used as a parameter. As seen from FIG. 6, the distribution of the temperature T of the recording film 63 when it is irradiated with the laser beam 9 having fixed irradiation power is wholly lowered as the linear velocity is increased. This is because the amount of received light per unit area at an outer peripheral position is reduced greatly as compared with that at an inner peripheral position.

Now it is assumed that the critical cooling rate of the recording film 63 is set at the value Csc indicated by the broken line in FIG. 5. In this case, the critical temperature of the recording film 63 is decided as Tc5, Tc7 and Tc10 in FIG. 6 for a linear velocity of 5 m/s, 7 m/s and 10 m/s, respectively. In the case of a linear velocity of v=5 m/s, the area of the recording film 63 where the temperature is higher than Tc5 is a part (amorphous) for information recording while the area thereof where the temperature is lower than Tc5 is a part (crystalline) for information erasure (see FIG. 4). This also applies to the cases of a linear velocity of v=7 m/s and 10 m/s.

On the basis of the above analysis, the recording width when the recording film 63 is irradiated with the same irradiation power P has been studied from the distribution of temperature T of the recording film in the track traversing direction (radial direction)in FIG. 6. As a result, it has been found that in contrast to the conventional optical disk, the position with a higher linear velocity (i.e. outer peripheral position) provides a wider recording width, a higher signal modulation degree and a higher CNR. Now, a signal modulation degree Δ is defined by $$\Delta = \frac{|R_E - R_W|}{\max(R_W, R_E)}$$

where $R_w$ and $R_z$ are output signal levels of written (amorphous) part and erased (crystalline) state, respectively.

On the other hand, if the linear velocity v is increased in such a manner that the driver as a motor enhances the rotating speed of the optical disk 68, the entire melted portion of the recording film 63 at a recording position acquires a sufficient cooling rate Cs thereby to be placed in a recording (amorphous) state. However, as the linear velocity v is increased, the temperature T of the recording film 63 is lowered. Thus, the track width in the radial, direction of the optical disk where the temperature exceeds the melting point Tm is decreased. Therefore, if the linear velocity v is further increased, the signal modulation degree will start to decrease as in the conventional technique.

Moreover, if the recording width is large than a certain value, CNR of a reproduced signal will be saturated, but the crosstalk will be abruptly decreasing. Further, if the recording width is too large, both ends of a track of the optical disk cannot be erased, thus reducing the erasability of the recording film.

Then, it has been found that the CNR, crosstalk and erasability which are uniform at inner and outer peripheral positions can be obtained by providing a uniform recording (and/or erasing) width at the inner and outer peripheral positions. In order to realize this, the following two methods can be proposed.

A first method is to set the critical cooling rate Csc of the recording film so as to be higher at an outer peripheral position than at an inner peripheral position. If this is carried out suitably, with the same irradiation power P at both inner and outer peripheral positions, the recording width (and/or erasing width) will be substantially uniform from the position with a lower linear velocity v (inner peripheral position) to the position with a higher linear velocity (outer peripheral position). Thus, a uniform reproduced signal can be obtained.

A second method is to set the temperature of the recording film so as to be lower at an outer peripheral position than at an inner peripheral position. This can be implemented by setting the irradiation power so as to be lower at the outer peripheral position than at the inner peripheral position.

As previously mentioned, in the optical disk having the uniform arrangement on both inner and outer peripheral sides, an outer peripheral position with a higher linear velocity v provides a smaller density of the irradiation power per unit area (amount of received light in the recording film 63). Therefore, as seen from FIG. 6, the temperature T of the recording film at a recording position is lower at the outer peripheral position than at the inner peripheral position.

Then, by positively modifying the structure of an optical disk at inner and outer peripheral positions so that the temperature T of the recording film at the outer peripheral position is lower than that in the optical disk 68 shown in FIG. 3, a uniform reproduced signal at both inner and outer peripheral positions can be obtained by predetermined irradiation power P. This can be implemented by setting the thermal capacity of the recording film to be larger at the outer peripheral position than at the inner peripheral position, or by providing more enhanced heat radiation effect (i.e. higher thermal conductivity) at the outer peripheral position than at the inner peripheral position.

Thus, in accordance with the present invention, it is possible to provide a phase change optical disk with its rotating speed fixed which does not require higher recording (writing) power and erasing power at its outer peripheral position than at its inner peripheral position.

Moreover, in accordance with the present invention, it is possible to provide a phase change optical disk with its rotating speed fixed in which the output characteristic of a reproduced signal in the single beam overwrite with the writing power and erasing power being set at predetermined values can be made uniform at inner and outer peripheral positions of the disk.

Furthermore, in accordance with the present invention, it is possible to provide a writing and/or method of using erasing method of using the above optical disk which can make uniform, at its both inner and outer peripheral positions of the disk rotating at a fixed rotary speed, the output characteristic of the reproduced signal in the single beam overwrite using the disk.

BRIEF DESCRIPTION OF THE DRAWINGS

FIG. 22 is a sectional view of a third embodiment of a phase change optical view according to the present invention;

FIG. 23 is a graph showing the relation between the thickness of the recording film shown in FIG. 22 and the reflectivity thereof;

DESCRIPTION OF THE PREFERRED EMBODIMENTS

Figure 1:
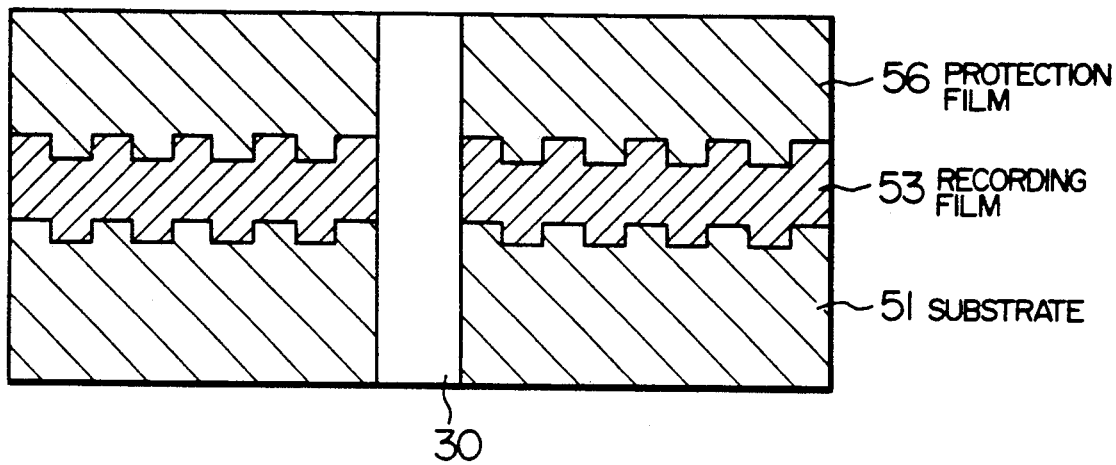
FIG. 1 is a sectional view of a structure of the conventional optical disk.

Referring to the drawings, several embodiments of the present invention will be explained in detail.

Figure 7:
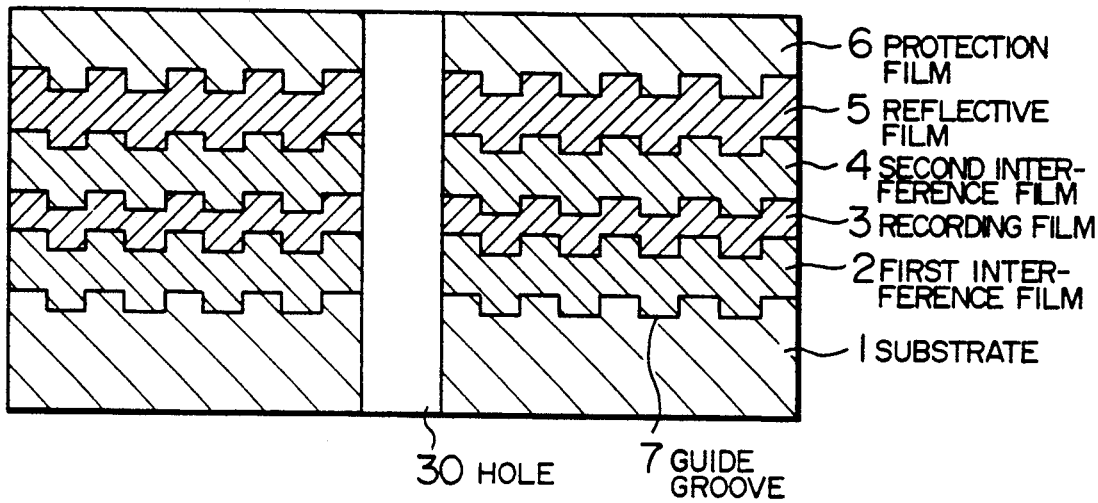
FIG. 7 is a sectional view of a phase change optical disk according to the related art, for explaining the embodiments of writting and/or erasing methods according to the present invention.

FIG. 7 shows in section a structure of a phase change optical disk 8 for use in explaining the embodiments of writing and/or erasing methods according to present invention, which is found in the related arts as disclosed in U.S. patent application Ser. No. 362,699.

In FIG. 7, 1 is a disk-shape (diameter: 130 cm) glass substrate having guide grooves 7 for tracking control; the guide groove has a width of 0.5 um, a depth of 70 nm and a pitch of 1.5 um. Formed on the glass substrate 1 by sputtering is a first interference film of $Si_3N_4$ about 70 nm thick. Formed on the first interference film 2 is a recording film 3 of a ternary compound of In-Sb-Te having a composition ratio of 21:36:43 (by atomic percent); the recording film has a thickness of about 30 nm. Formed on the recording film 3 is a second interference film 4 of $Si_3N_4$ about 70 nm thick. Formed on the second interference film 4 is a reflective film 5 of Au having a thickness of about 100 nm. Finally formed on the reflective film 5 is a protection film 6 of $Si_3N_4$ about 100 nm thick.

The thickness of each film is set to be uniform at inner and outer peripheral positions of the optical disk 8. In this way, a one-side type optical disk is provided. Otherwise, a both-side type optical disk can be provided by bonding such two one-side type optical disks to each other.

Figure 8:
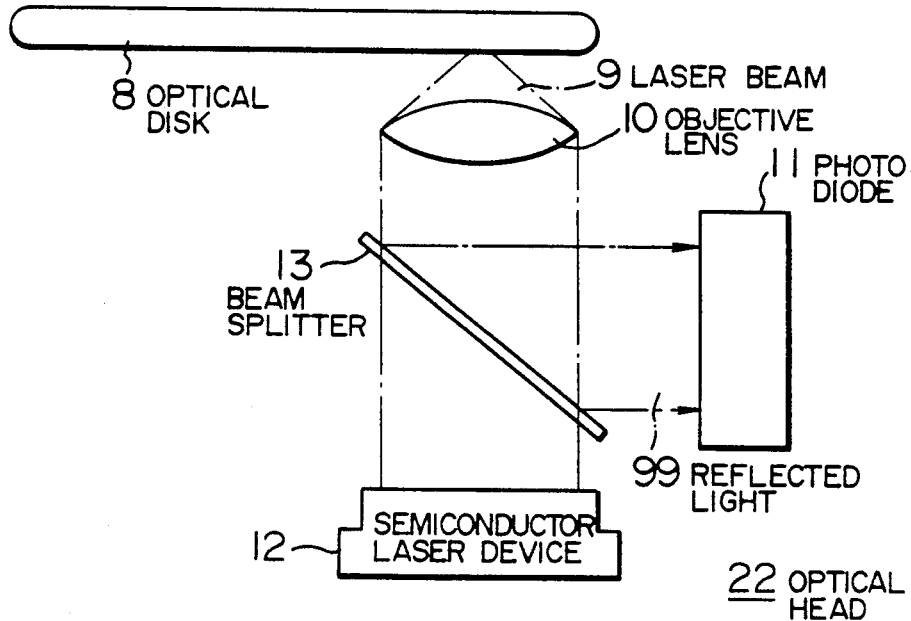
FIG. 8 is a schematic diagram of an optical head for writing, erasing and reproducing information for the optical disk shown in FIG. 7.

FIG. 8 shows a construction of an optical head 22 for writing, erasing and reproducing information for the optical disk. In FIG. 8, the optical disk 8 is also shown for convenience of explanation.

In writing or erasing information, a laser beam 9 emitted from a semiconductor laser device 12 is passed through a beam splitter 13 and thereafter is focused on the recording surface of the optical disk 8 by an objective lens 10. In this case, the laser beam 9 is focused in a beam diameter of about 1 um. In writing, the optical disk 8 is irradiated with the laser beam 9 with the irradiation power (writing power Pw) enough to melt the recording film; in erasing, the optical disk 8 is irradiated with the laser beam 9 with the irradiation power (erasing power Pe) which is smaller than the writing power Pw. In reproducing information, the optical disk 8 is irradiated with the laser beam 9 with the irradiation power (reproduction power Po) which is considerably smaller than the writing and erasing powers; the light 99 reflected from the optical disk 8 is incident on a photodiode (light receiving device) 11 though the objective lens 10 and the beam splitter 13. The photodiode 11 detects the reflected light 99 thereby to provide a reproduced signal.

The characteristic of the DC modulation degree against the linear velocity of the optical disk 8 will be explained. The DC modulation degree can be measured as follows. Tracks are initialized (crystallized) while rotating the optical disk 8 shown in FIG. 7. There after, DC recording, which means continuous recording with power level fixed, is carried out with the irradiation power of 12 mW using the above optical head 22. Then, the signal reproduced from the photodiode (light receiving device) 11 is measured to acquire the signal modulation degree (DC modulation degree). The DC modulation degree $\Delta_{DC}$ is defined by:

$$\Delta_{DC} = \left| \frac{R_0 - R}{\max(R, R_0)} \right|$$

where $R_0$ is the output signal level from the photodiode 11 after the initialization, and R is the output signal level from the photodiode 11 after the DC recording.

From this definition the larger the difference between R and $R_o$ is, the higher is the DC modulation degree. The wider recording width by DC recording makes the larger difference between R and $R_o$. Therefore the wider recording width means is the higher DC is modulation degree.

Figure 9:
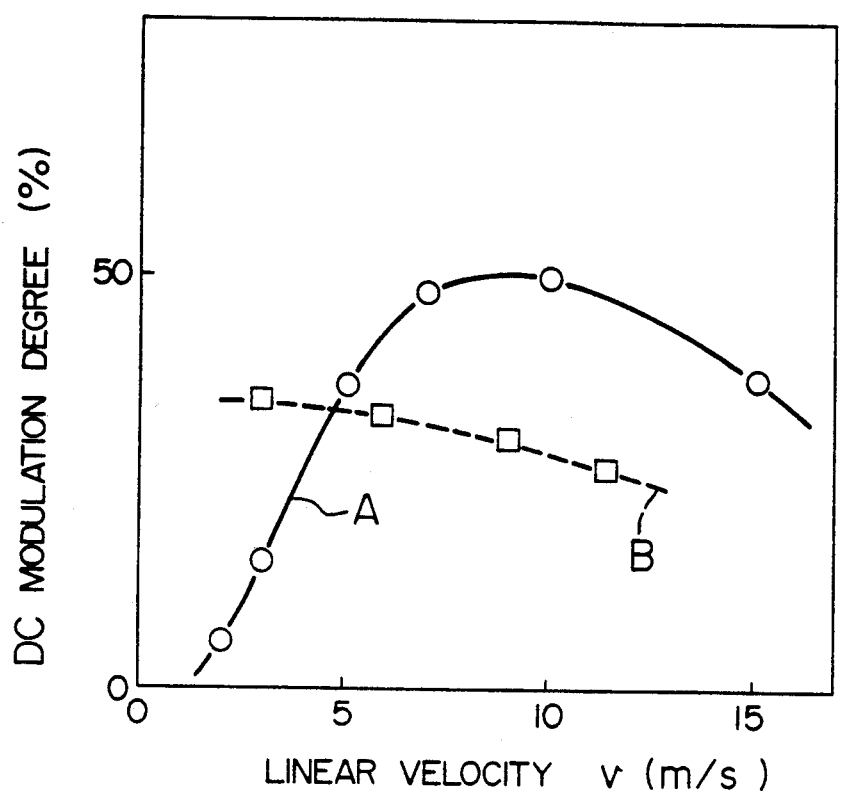
FIG. 9 is a graph showing the relation between the linear velocity and the DC modulation degree in the related art.

In FIG. 9, the relation between the the linear velocity v and the DC modulation degree in the optical disk 8 is shown as characteristic A. For comparison, the same relation in the optical disk 58 shown in FIG. 1 is also shown as characteristic B.

As understood from the comparison between the characteristics A and B, in the conventional optical disk 58, the DC modulation degree monotonously decreases as the linear velocity increases. On the other hand, in the optical disk 8 as the linear velocity v increases, the modulation degree once increases, but thereafter starts to decrease. This reason is considered as follows.

In the conventional optical disk 58, the recording film 53 having the critical cooling rate Csc which is lower than the cooling rate Cs obtained while the optical disk 58 is rotated is used so that the entire melted portion will be placed in a recording (amorphous) state. Therefore, the melted portion narrows as the linear velocity v increases, and correspondingly the modulation degree decreases.

Figure 4:
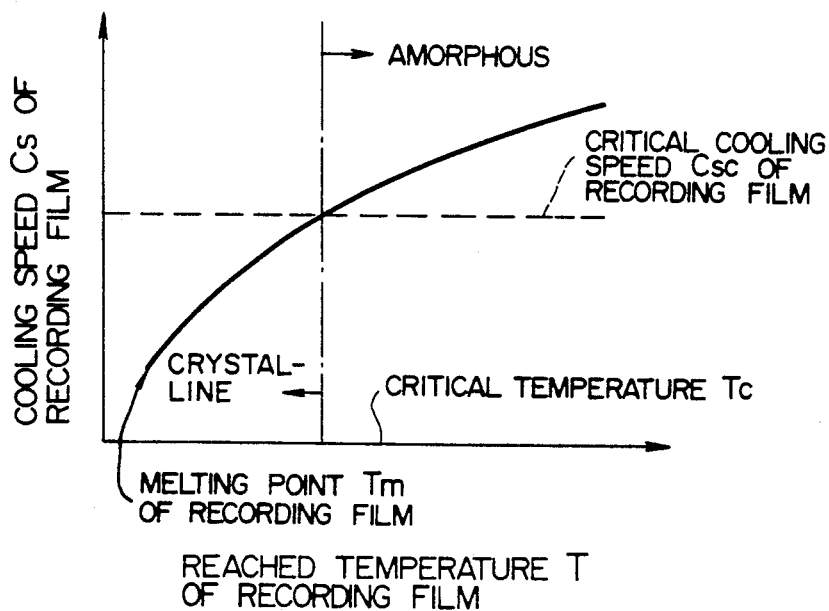
FIG. 4 is a graph showing the relation between the temperature T of a recording film when heated to temperatures over its melting point at a writing (or erasing) position, and the cooling rate Cs when the temperature of the recording film passes a crystallization temperature zone in a cooling process of the recording film.
Figure 5:
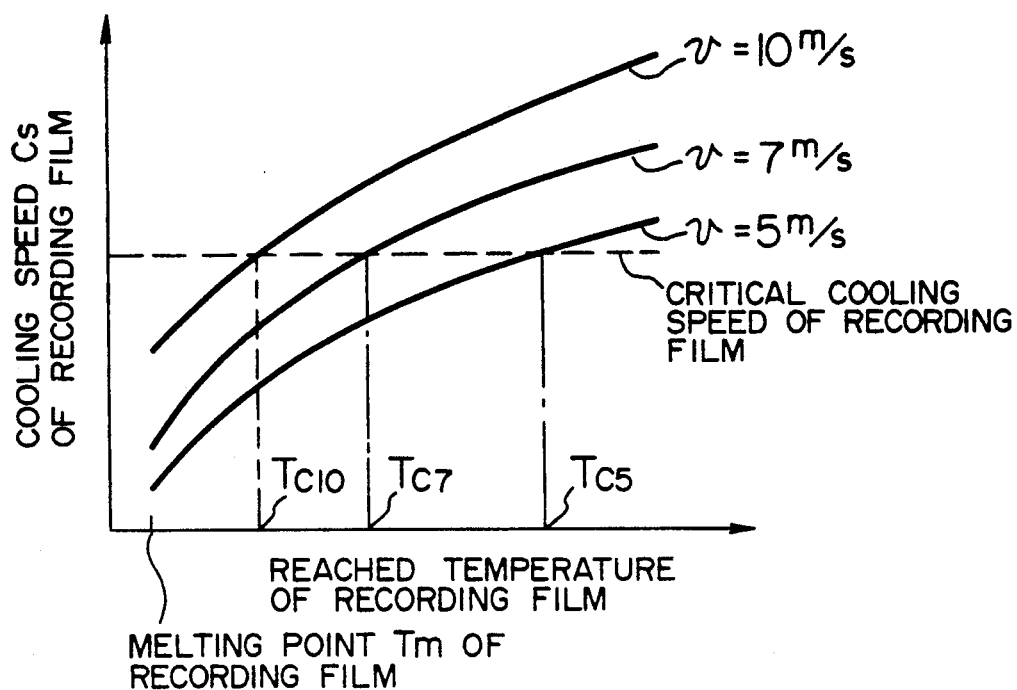
FIG. 5 is a graph showing the relation between the temperature T of the recording film and the cooling rate Cs when a linear velocity of the optical disk is used as a parameter.
Figure 6:
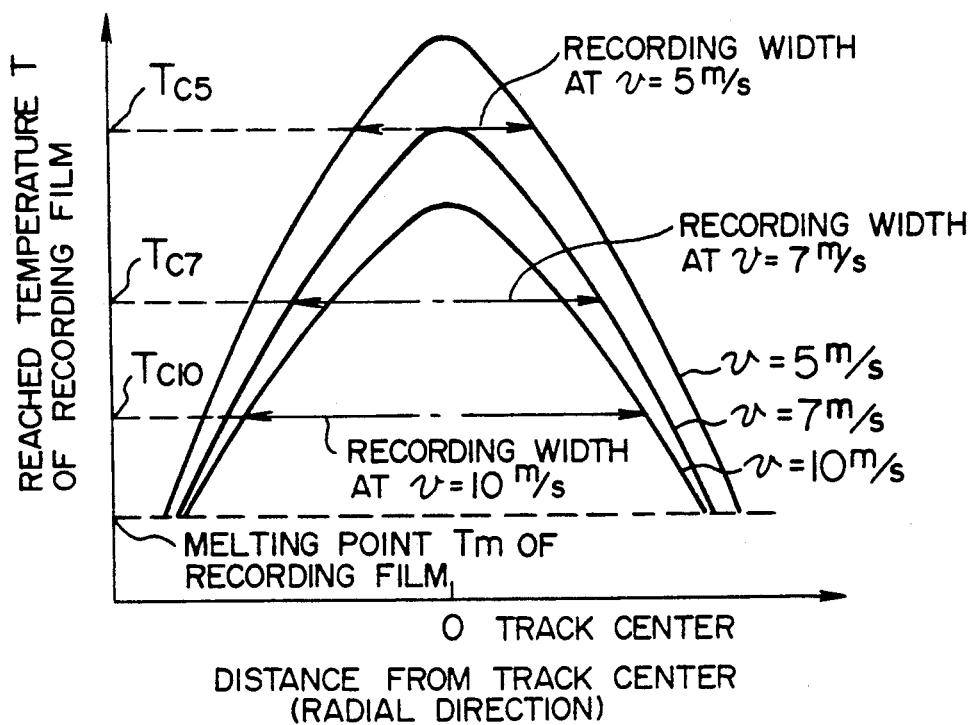
FIG. 6 is a graph showing characteristics of the temperature of the recording film in a track traversing direction (i.e. radial direction of the optical disk) when the linear velocity v is used as a parameter.

On the other hand, in the optical disk 8 the recording film 3 has a suitable value of the critical cooling rate Csc so that the recording film at a recording position, after having been melted, will become crystalline or amorphous in accordance with the subsequent cooling rate Cs. In the arrangement of the optical disk 8, as described previously (FIG. 5), the cooling rate Cs after the recording film has been melted depends on the linear velocity v so that a higher cooling rate Cs results when the laser beam 9 passes faster. Thus, the higher the linear velocity v, the wider is the recording width of the track to be amorphous (see FIGS. 4 and 6). As a result, a higher signal modulation degree is provided.

However, when the linear velocity further increases, the entire melted area of the recording film 3 acquires the cooling rate Cs high enough to be placed in a recording (amorphous) state. In such a linear velocity, the recording width of the track which is at a temperature higher than the melting point of the recording film 3 narrows with an increase of the linear velocity v. Therefore, if the linear speed continues to increase, the signal modulation degree starts to decrease as in the conventional optical disk.

However, it should be noted that the characteristic A of the disk 8 in FIG. 9 provides a substantially almost constant DC modulation degree in a range of the linear speed of 7 m/s to 12 m/s. Thus, with the writing power Pw fixed, substantially constant signal modulation degree can be obtained in the this range of the linear velocity of the optical disk.

Meanwhile, in order to provide the output characteristic of a uniform reproduced signal at inner and outer peripheral positions when the phase change optical disk 8 is rotated at a prescribed speed, it is effective to control the irradiation power P in accordance with the radial position r (or linear velocity v) of the optical disk 8. This will be explained below.

Figure 10:
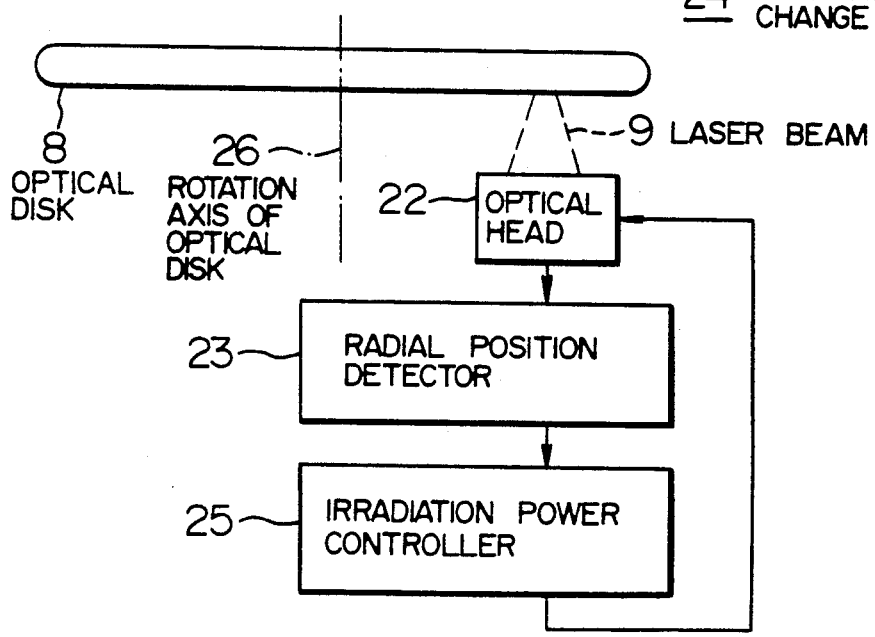
FIG. 10 is a schematic diagram of the first example of a writing/erasing device using the optical disk according to the present invention.

FIG. 10 shows the first arrangement 24 of a writing/erasing apparatus using the phase change optical disk according to the present invention; for explanation of convenience, the optical disk 8 is also shown.

In FIG. 10, 22 is an optical head. 23 is a detector (potentiometer) for detecting the radial position of the optical head 22; the detector 23 serves to the position of the optical head 22 measured from the rotary shaft 26 of the optical disk 8. 25 is an irradiation power controller which can be constructed by a microcomputer; the irradiation power controller 25 serves to produce required writing power Pw and erasing power Pe in response to an output signal from the radial position detector 23.

Figure 2:
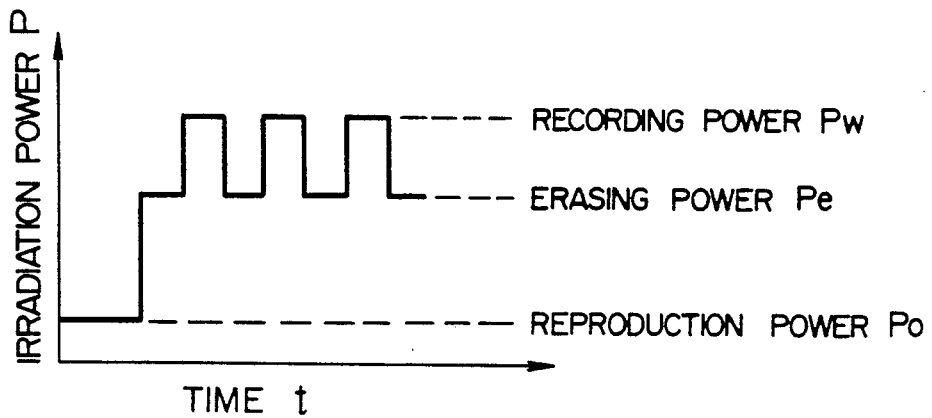
FIG. 2 is a graph showing a characteristic of the irradiation power P of a laser beam in carrying out single beam overwrite.

In the writing/erasing apparatus 24 thus constructed, the optical disk 8 shown in FIG. 7 was rotated at a speed of 1800 rpm thereby to measure the reproduced signal from the photodiode 11 during single beam overwrite. In carrying out the single beam overwrite, the phase change optical disk 8 was irradiated with the modulated irradiation power P as shown in FIG. 2.

Figure 11:
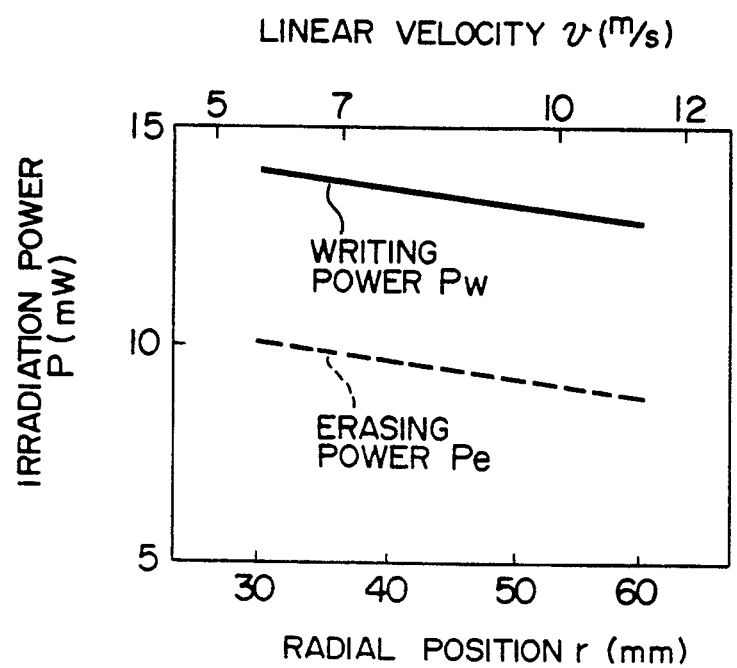
FIG. 11 is a graph showing the first relation between the radial position of an optical disk and the irradiation power which are set in a method of using the optical disk according to the present invention.

Further, the writing power Pw and the erasing power Pe were set to be continuously lower at an outer peripheral position than at an inner peripheral position as shown in FIG. 11. More specifically, at a radial position of 30 mm, the writing power Pw was set at about 14 mW and the erasing power Pe was set at about 10 mW; at a radial position of 60 mm, Pw was set at about 13 mW and Pe was set at about 9 mW. Incidentally, it is the case where a signal at a frequency of 2 MHz has been recorded after track initialization (crystallization) and subsequently a signal at the frequency of 3 MHz has overwritten.

Figure 12:
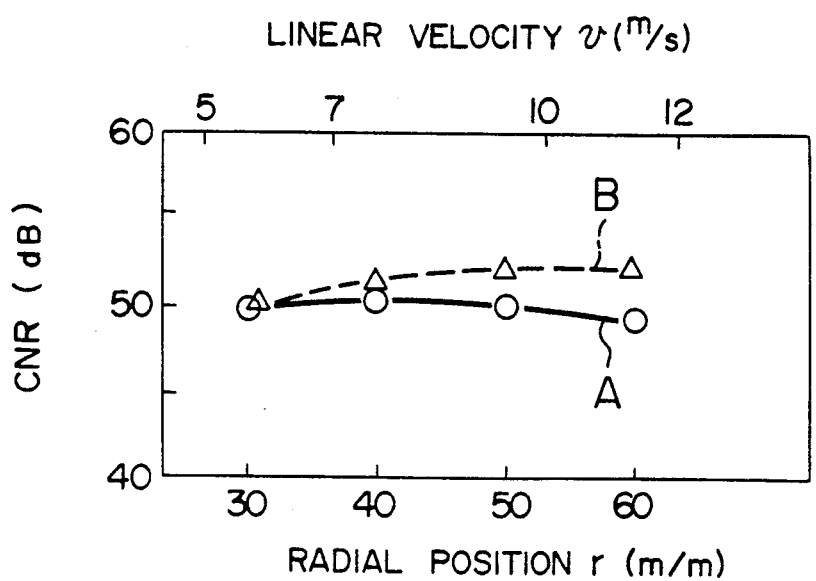
FIG. 12 is a graph showing a relation between the radial direction of an optical disk and CNR in a method of using the optical disk according to the present invention.
Figure 13:
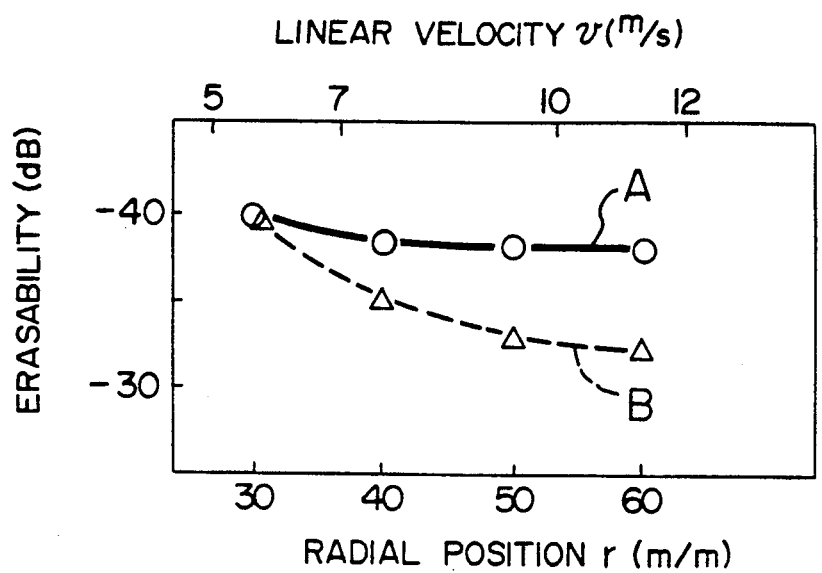
FIG. 13 is a graph showing the relation between the radial direction and erasability in a method of using the optical disk according to the present invention.
Figure 14:
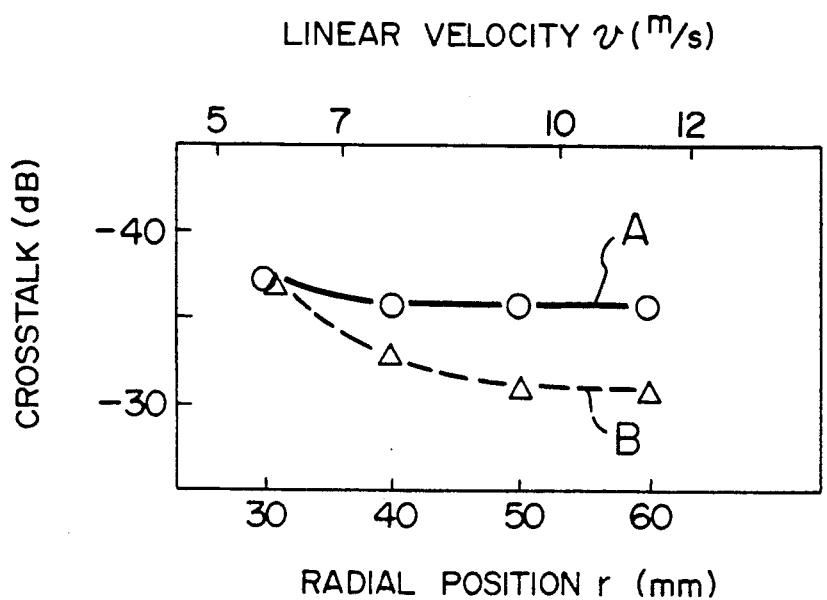
FIG. 14 is a graph showing a relation between the radial direction and crosstalk in a method of using the optical disk according to the present invention.

The measurement results relative to the reproduced signal from the photodiode 11 are shown in FIGS. 12, 13, and 14. In FIG. 12, the relation between the radial position r and CNR is shown as a characteristic A; in FIG. 13, the relation between the radial position r and erasability is shown as a characteristic A; and in FIG. 14, the relation between the radial position and crosstalk is shown in FIG. 14. The other measurement results for comparison are also shown as characteristics B in FIGS. 12, 13, and 14; the measurements were carried out in the same way except that at both inner and outer peripheral positions of the optical disk 8, the writing power Pw was fixed to about 14 mW and the erasing power Pe was fixed to about 10 mW.

As understood from the comparison between the characteristics A and B in FIGS. 12, 13, and 14, the characteristics B provide greatly reduced erasability and crosstalk at an outer peripheral position. The method of using the optical disk which exhibits the characteristics B, therefore, cannot make uniform the quality of the reproduced signal at both inner and outer peripheral positions. On the other hand, the method of using the optical disk which exhibits the characteristics A (i.e. setting Pw and Pe so as to be lower at an outer peripheral position) can restrict variation in the CNR, erasability and crosstalk within 2 dB and so can provide a substantially uniform reproduced signal at both inner and outer peripheral positions.

The reason of setting Pw and Pe so as to be lower towards an outer peripheral position is as follows. If the irradiation(writing and erasing) power P is fixed at inner and outer peripheral positions, the cooling rate Cs after melting will be higher towards an outer peripheral position with a higher linear velocity v. Thus, a higher level signal will be recorded towards an outer peripheral position. This undesired effect can be restricted by setting the writing power Pw so as to be lower at an outer peripheral position than at an inner peripheral position (This also applies to the erasing power Pe).

Figure 15:
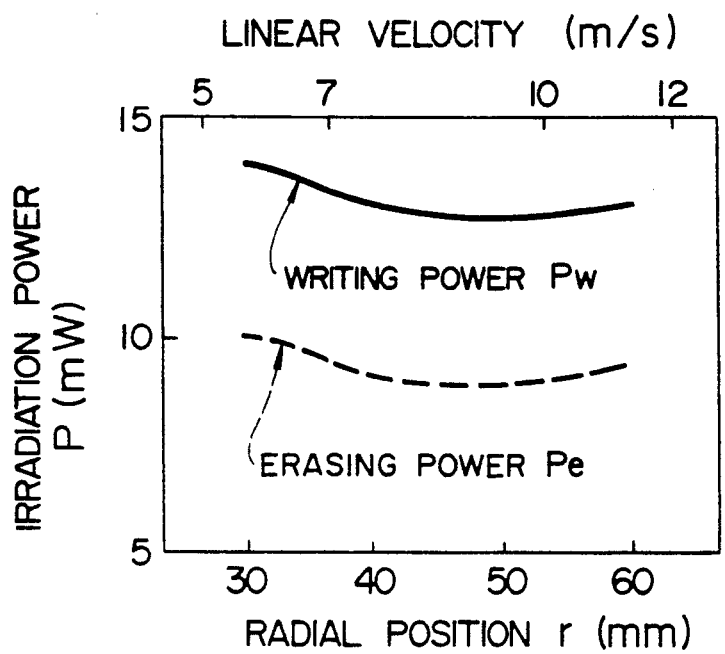
FIG. 15 is a graph showing the second relation between the radial position of an optical disk and the irradiation power which are set in a method of using the optical disk according to the present invention.

With Pw and Pe set to be non-linearly lower towards an outer peripheral position as shown in FIG. 15, the inventors of the present invention made the same measurements as described above. The measurement results were CNR of 49 dB to 51 dB, erasability of $-40$ dB to $-38$ dB, and crosstalk of $-37$ dB to $-35$ dB which are better than the measurements for comparison (characteristics B in FIGS. 12, 13, and 14).

Moreover, with Pw and Pe set to decrease stepwise towards an outer peripheral side, the inventors made the same measurements. More specifically, the optical disk 8 was partitioned into two areas of an inner peripheral side area in the radial position of 30 mm to 40 mm and an outer peripheral side area in the radial position of 40 mm to 60 mm. For the inner peripheral side area, Pw and Pe were fixed to about 14 mW and about 10 mW, respectively, whereas for the outer peripheral side area, Pw and Pe were fixed to about 13 mW and 9 mW, respectively. The measurement results were CNR of 50 to 52 dB, erasability of $-40$ dB to $-35$ dB, and crosstalk of $-37$ dB to $-33$ dB which are better than those for comparison (characteristics B in FIGS. 12, 13, and 14). Additionally, the optical disk 8 may be partitioned into three or more areas. This makes it possible to provide substantially the same effect as the case where the irradiation power is continuously changed.

Figure 16:
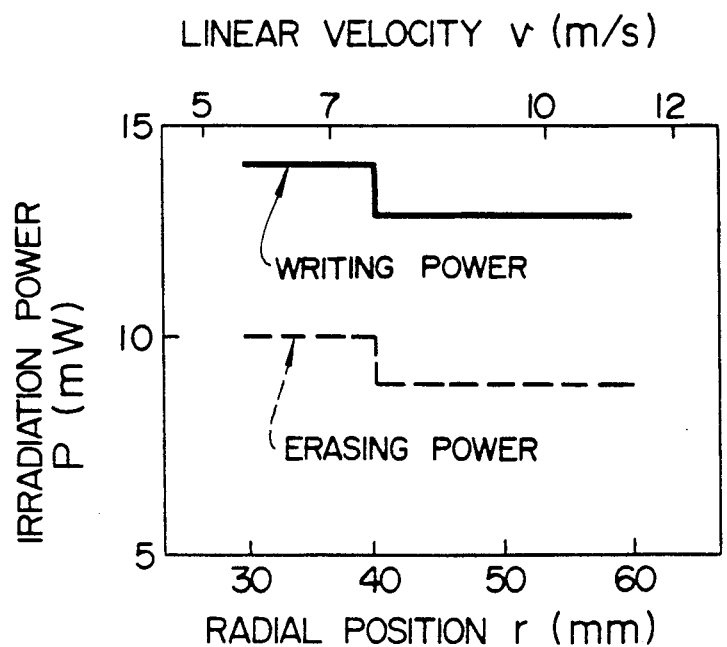
FIG. 16 is a graph showing the third relation between the radial position of an optical disk and the irradiation power which are set in a method of using the optical disk according to the present invention.
Figure 17:
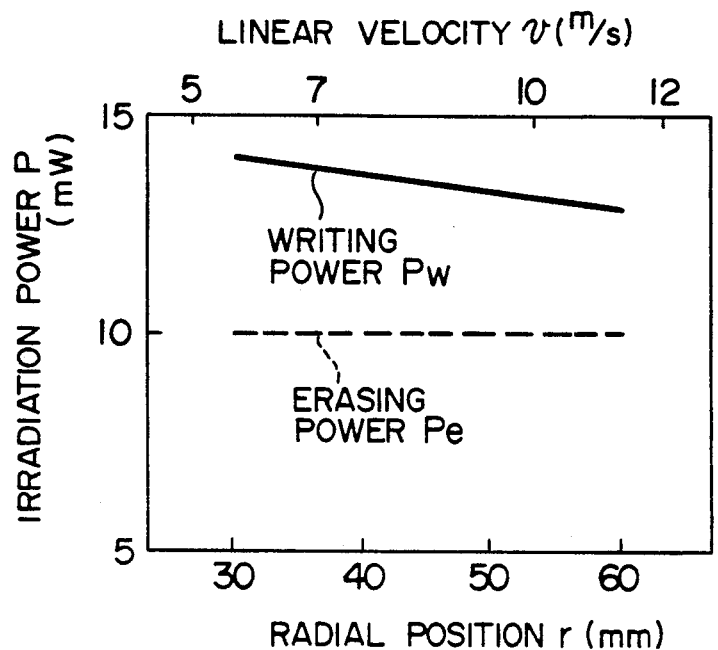
FIG. 17 is a graph showing the fourth relation between the radial position of an optical disk and the irradiation power which are set in a method of using the optical disk according to the present invention.

Furthermore, it was confirmed that the quality of the reproduced signal can be improved as compared with the measurement results for comparison (characteristics B}by setting either one of Pw or Pe to be lower at an outer peripheral position and the other to be fixed; in an example of FIG. 17, Pw is varied while Pe is fixed. In this case also, the irradiation power may be controlled stepwise as mentioned above (FIG. 16).

Figure 18:
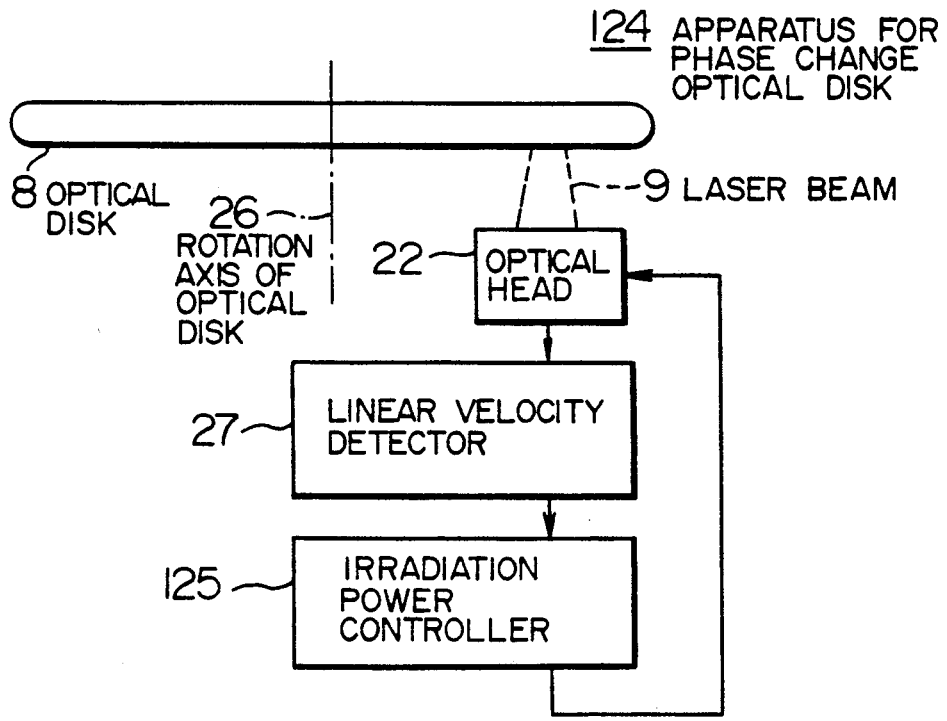
FIG. 18 is a schematic diagram of the second example of a writing/erasing device using the optical disk according to the present invention.

Additionally, the radial position detector 23 in the writing/erasing apparatus 24 of FIG. 10 may be placed by a liner velocity detector 27 shown in FIG. 18 which shows the second example 124 of a writing/erasing apparatus using a phase change optical disk according to the present invention. The linear velocity detector 27 serves to produce a linear velocity signal in accordance with an address signal, etc. An irradiation power controller 125 produces required writing power Pw and erasing power Pe in accordance with an output signal from the linear velocity detector 27. It should be noted that the linear velocity v is a function of the number of revolutions N (rpm) (angular velocity $\omega = 2\pi N/60$ (rad/s)) and the radial position r; since the number of revolutions is fixed, controlling the irradiation power using the linear velocity v is equivalent to controlling the irradiation power using the radial position r.

Figure 19:
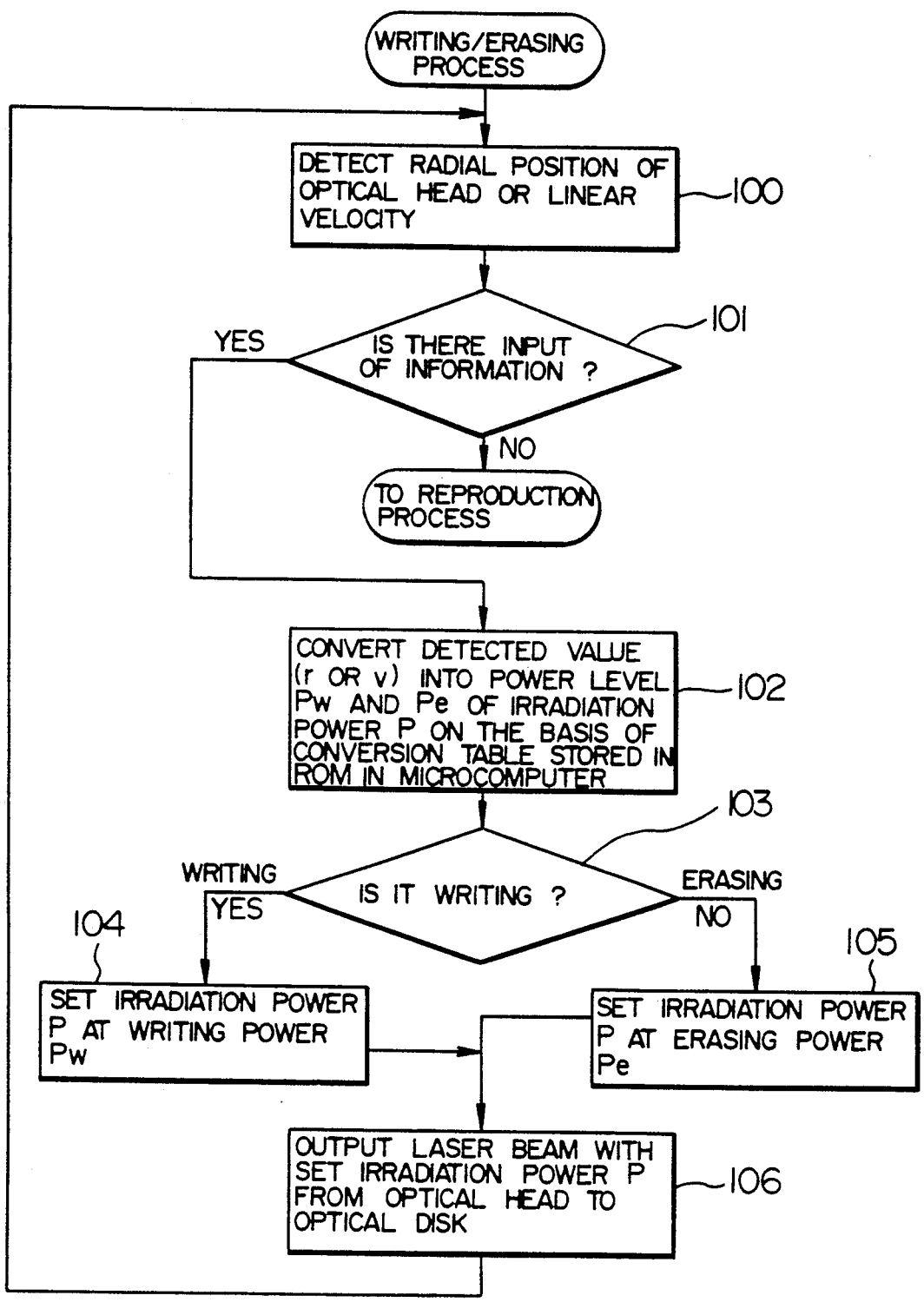
FIG. 19 is a flow chart of one embodiment of a method of using or operating the optical disk in accordance with the present invention.

FIG. 19 is a flow chart of an embodiment of a using method in accordance with the present invention in connection with a writing/erasing process.

When the writing/erasing process is started, the radial position r where the optical head 22 is located or its linear velocity v is detected (step 100). Whether or not information to be written or erased has been inputted is decided (step 101). When it is 'YES', the above detected value (r or v) is converted into the power level Pw and Pe of the irradiation power to be used on the basis of a conversion table, which is stored in a read only memory (ROM) included in the irradiation power controller 25 (or 125); the conversion table is formed by the numerical data of the characteristic shown in one of FIGS. 11, 15, 16, and 17. More specifically, the above detected value is supplied to the ROM as an address input signal so that Pw and Pe (numerical data) are taken from the ROM as a data output signal (step 102). Whether or not the input information is information to be written is decided (step 103). When it is 'YES', the irradiation power of the laser beam 9 output from the optical head 22 is set at the writing power Pw (step 104). When it is 'NO' (the input information is information to be erased), the irradiation power P is set at the erasing power Pe (step 105). Finally, the optical disk 8 is irradiated with the laser beam 9 with the set irradiation power from the optical head 22 (step 106). Thereafter, the writing/erasing process is initiated from step 100.

Incidentally, when no information is inputted in step 101, the process is shifted to the reproduction processing. A reproduced signal is read from the optical disk 8 by the optical head 22. Then the irradiation power P is set at a reproduction power Po.

In the optical disk using method described above, in order to make uniform the output characteristic of the reproduced signal in the first embodiment of a phase change optical disk at its both inner and outer peripheral positions, the irradiation power P is controlled in accordance with the linear velocity v or the radial position r. However, without controlling the irradiation power, it is also possible to make uniform the output characteristic of the reproduced signal at both inner and outer peripheral positions. This can be implemented by modifying the construction of the optical disk in accordance with the inner and other peripheral positions of the disk in the second embodiment of a phase change optical disk according to the present invention as described below.

Figure 20:
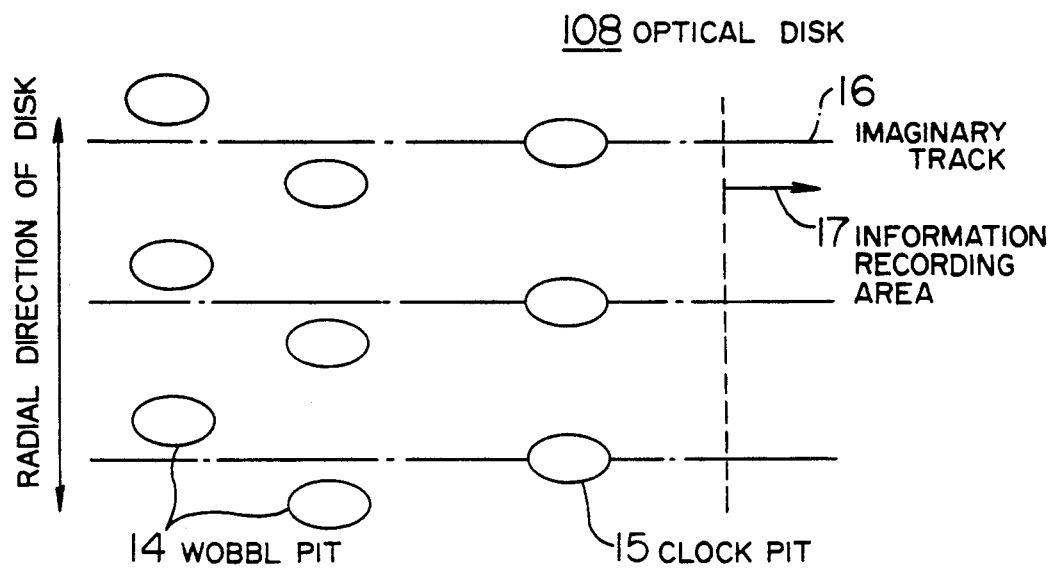
FIG. 20 is a partially enlarged view for explaining a second embodiment of a phase change optical disk according to the present invention.

In phase change optical disk according to this embodiment, a substrate having pits for tracking as shown in FIG. 20 is used in place of the substrate 1 having the guide grooves 7 in the optical disk 8 as shown in FIG. 7. In this embodiment, the first interference film 2 is also removed from the optical disk 8 shown in FIG. 7.

Figure 3:
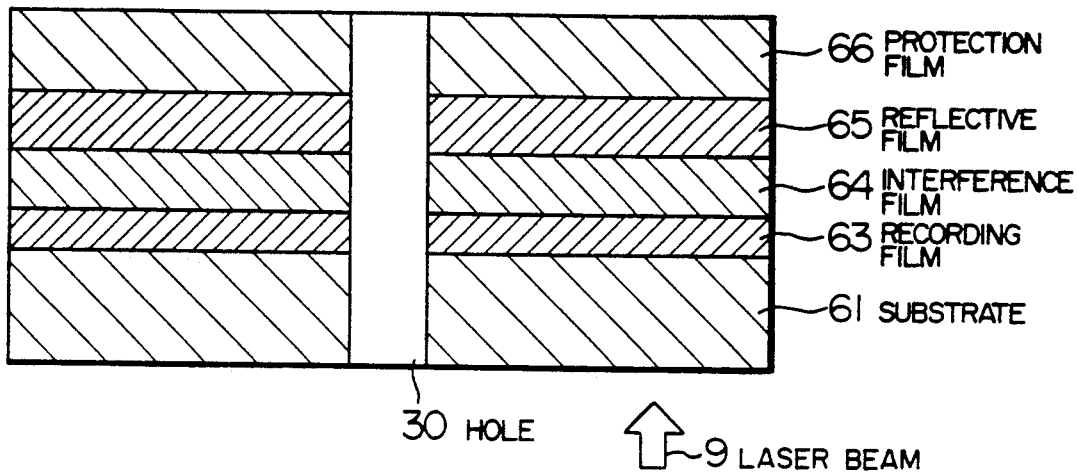
FIG. 3 is a sectional view of a structure of the phase change optical disk according to the related art.
Figure 21:
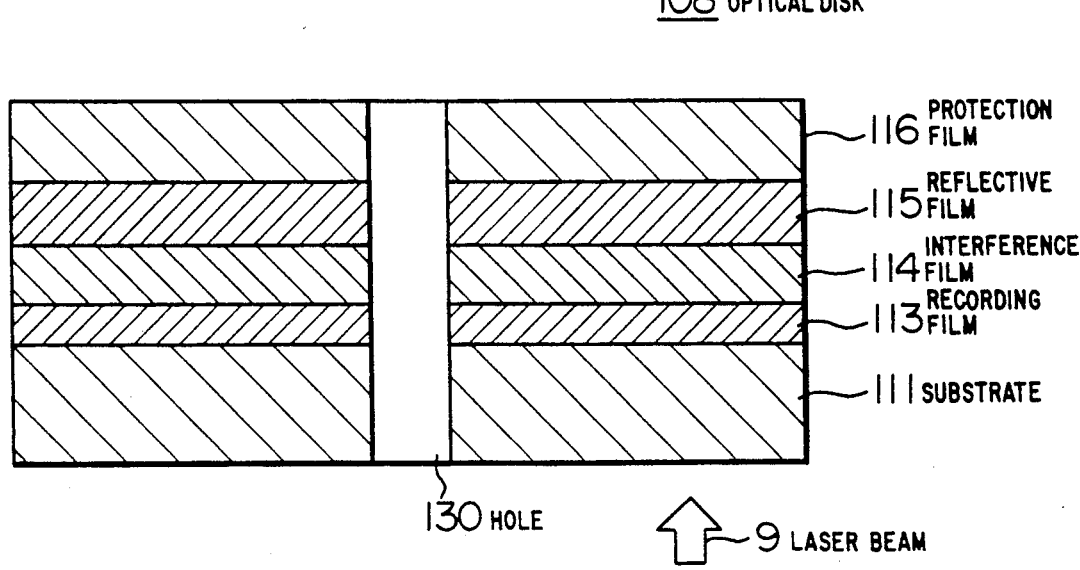
FIG. 21 is a sectional view of the second embodiment of a phase change optical disk according to the present invention.

Now referring to FIGS. 20 and 21, an optical disk 108 according to this embodiment will be explained; the construction of FIG. 21 is similar to that shown in FIG. 3.

FIG. 20 is a partially enlarged plan view of the principal surface of a substrate 111 of the optical disk 108 according to this embodiment. The optical disk 108 according to this embodiment is adapted to a system for doing tracking control by detecting pits (sample servo system).

In FIG. 20, 14 are wobble pits; 15 are clock pits; 16 is an imaginary track; and 17 is an information recording area defined by an arrow. The sample servo system carries out tracking control by detecting the wobble pits and clock pits.

The arrangement of the optical disk 108 according to this embodiment will be explained with reference to the sectional view of FIG. 21. In FIG. 21, formed on a disk-shaped glass substrate 111 having a diameter of 130 cm is a recording film 113 made of IN - Sb - Te which is about 30 nm thick. The composition ratio is 21:37:42 (atomic percent) at an inner radial peripheral position of a radius of 30 mm and 28:30:42 (atomic percent) at an outer peripheral position of a radius of 60 mm; it should be noted that the content of Sb is less at an outer peripheral position. Formed on the recording film 113 is an interference film 114 of AlN which is about 70 nm. Formed on the interference film 114 is a reflective film 115 of Al which is 100 nm. Finally, formed on the reflective film 115 is a protection film 116 of ultraviolet setting resin. Thus, a one-side type optical disk is fabricated. 130 is a hole centrally provided on the principal surface of the optical disk 108. Incidentally, a both-side type optical disk may be formed by bonding two sheets of the one-side type optical disk.

The inventors of the present invention measured the reproduced signal in single beam overwrite in the same manner as in the first embodiment of a using method except that the writing power Pw and the erasing power Pe are fixed to 14 mW and 10 n mW at both inner and outer peripheral positions, respectively. As a result, a CNR of 51 dB, an erasability of −40 dB and a crosstalk of −37 dB were provided at the inner peripheral position of a radius of 30 mm while a CNR of 50 dB, an erasability of −37 dB and a crosstalk of −35 dB were obtained at the outer peripheral position of a radius of 60 mm. It should be noted that these measurement results are better (i.e. more uniform at both peripheral positions) than the characteristics of B in FIGS. 12 to 14 although Pw and Pe are fixed at both peripheral positions. The reason for this will be explained below.

As stated before (see FIG. 5), the cooling speed Cs is higher toward an outer peripheral position with a high linear velocity v. In this case, if the melt-erasing single beam overwrite is carried out using the recording film with the critical cooling speed Csc fixed at both inner and outer peripheral positions, the recording width is wider at an outer peripheral position so that the signal modulation degree is higher at an outer peripheral position. In this second embodiment, however, the content of Sb in the recording film 113 is made less at the outer peripheral position with a higher cooling speed thereby set the critical cooling speed at a large value. For this reason, the reproduced signal can be made uniform at both inner and outer peripheral positions.

Moreover, the thermal conductivity of the recording film 113 is higher toward an outer peripheral position where the content of In is higher and In has a good thermal conductivity. Therefore the temperature T at the outer peripheral position of the recording film is lower than that of a recording film which has a uniform composition ratio of 21:37:42 (at.%) both at inner and outer radial peripheral positions. This also improves the characteristic of the disk according to this embodiment.

FIG. 22 shows the section of a third embodiment 138 of an optical disk according the present invention. This third embodiment has the same arrangement as the optical disk 8 shown in FIG. 7. Namely, a numeral 131 is a substrate; 132 is a first interference film; 137 are guide grooves, 148 is a recording film; 134 is a second interference film; 135 is a reflective film; 136 is a protection film; and 230 is a hole. It should be noted that the recording film is adapted to be thicker at an outer peripheral position in such a way that it is 25 nm thick at an inner peripheral end and 45 nm thick at an outer peripheral end. Also it should be noted that the composition of In-Sb-Te in the recording film 148 is fixed to 21:36:43 at both inner and outer peripheral positions.

The inventors of the present application measured the reproduced signal in single beam overwrite in the same manner (Pw=14 mW and Pe=10 mW) as in the second embodiment (FIG. 21). As a result, a CNR of 52 dB, an erasability of −39 dB and a crosstalk of −36 dB were provided at the inner peripheral position of a radius of 30 mm while a CNR of 52 dB, an erasability of −37 dB and a crosstalk of −34 dB were obtained at the outer peripheral position of a radius of 60 mm. It should be noted that these measurement results are better (i.e. more uniform at both peripheral positions) than the characteristics of B in FIGS. 12 to 14 although Pw and Pe are fixed at both peripheral positions. The reason for this is as follows. Since the recording film 148 is adapted to be thicker at an outer peripheral position than at an inner peripheral position, the volume of the heated portion (position) is made larger toward an outer peripheral position; the temperature T of the recording film 148 is suppressed at the outer peripheral position. Thus, the substantially uniform modulation degree can be obtained at both inner and outer peripheral positions.

FIG. 23 is a graph showing the relation between the thickness of the recording film 148 and reflectivity of the disk 138. As seen from FIG. 23, when the thickness varies from 25 nm to 45 nm, the reflectivity does not so greatly vary in both amorphous state (indicated by a solid line) and crystalline state (indicated by a dotted line). Therefore, the difference in the reflectivity between the inner and outer peripheral positions due to the difference in the thickness therebetween is negligible in both writing state (amorphous state) and erasing state (crystalline state). Such a characteristic of the optical disk 138 can be realized with any other material of the recording film 148 by suitably setting the material and thickness of the interference films 132 and 134.

Figure 24:
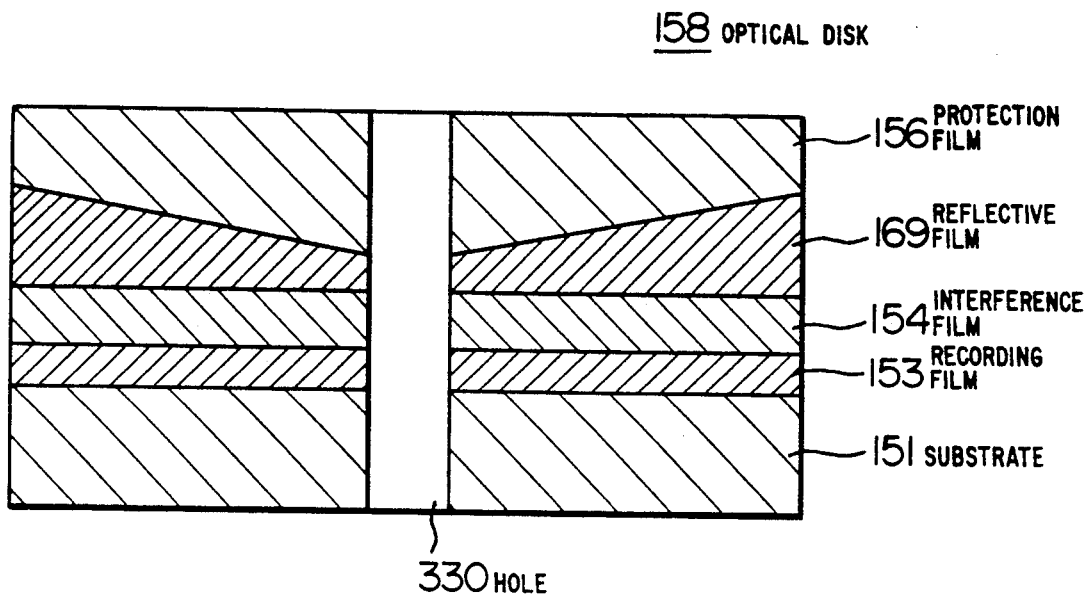
FIG. 24 is a sectional view of a fourth embodiment of a phase change optical disk according to the present invention.

FIG. 24 shows the section of a fourth embodiment 158 of an optical disk according to the present invention. In FIG. 24, 151 is a substrate made of PC (polycarbonate) which is a disk with a diameter of 130 cm; it has pits for tracking control as shown in FIG. 20. Formed on the substrate 151 is a recording film 153 of In-Sb-Te (the composition ratio is 21:36:43 by atomic percent) by sputtering; the recording film is about 30 nm. Formed on the recording film 153 is an interference film 154 of ZnS which is about 70 nm thick. Formed on the interference film 154 is a reflective film 169 of Cu the thickness of which is continuously increased from an inner peripheral position to an outer peripheral position in such a manner that it is about 80 nm at an inner peripheral position of a radius of 30 mm and is about 150 nm at an outer peripheral position of a radius of 60 mm. Finally, formed on the reflective film 169 is a protection film 156. Thus, an one-side type optical disk 158 is fabricated. Incidentally, a numeral 330 denotes a hole. As previously mentioned, two sheets of the optical disk may be bonded.

The inventors of the present invention measured the reproduced signal in single beam overwrite in the same manner (Pw=14 mW and Pe=10 mW) as in the second embodiment (FIG. 21). As a result, a CNR of 52 dB, an erasability of −38 dB and a crosstalk of −37 dB were provided at the inner peripheral position of a radius of 30 mm while a CNR of 50 dB, an erasability of −0376 dB and a crosstalk of −35 dB were obtained at the outer peripheral position of a radius of 60 mm. It should be noted that these measurement results are better (i.e. more uniform at both peripheral positions) than the characteristics of B in FIGS. 12 to 14 although Pw and Pe are fixed at both inner and outer peripheral positions. The reason for this is as follows. Since the recording film 169 is adapted to be thicker at an outer position, the heat absorption amount of the reflective film 169 from the recording film 153 is larger at an outer peripheral position than at an inner peripheral position the temperature T of the recording film 153 is suppressed at the outer peripheral position. Thus, the substantially uniform modulation degree can be obtained at both inner and outer peripheral positions.

Figure 25:
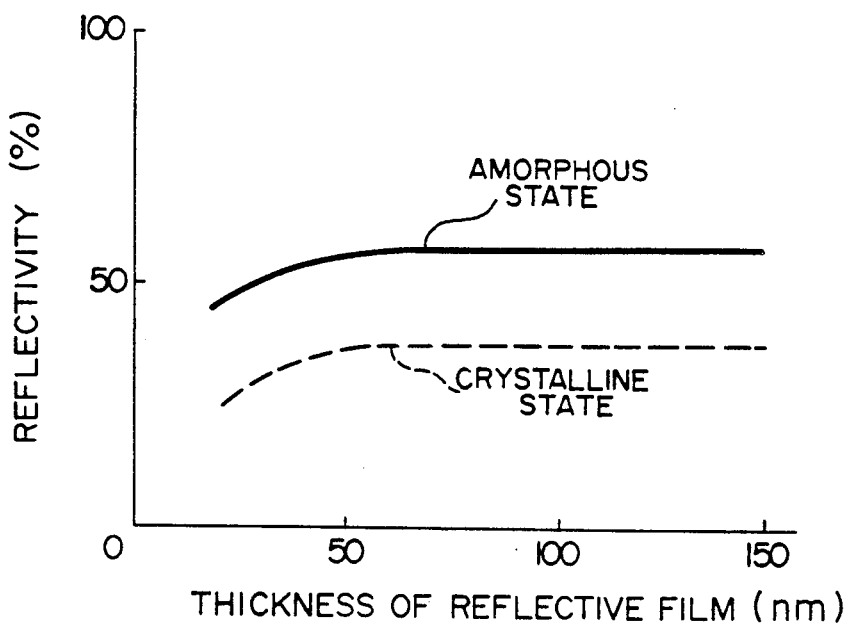
FIG. 25 is a graph showing the relation between the thickness of the reflective film shown in FIG. 24 and the reflectivity thereof.

FIG. 25 is a graph showing the relation between the thickness of the reflective film 169 and the reflectivity of the optical disk 158 in the case where the recording film is an amorphous or crystalline state. As seen from FIG. 25, when the thickness is 50 nm or more, the reflectivity does not vary entirely in both amorphous state (indicated by a solid line) and crystalline state (indicated by a dotted line). Therefore, the difference in the reflectivity between the inner and outer peripheral positions due to the difference in the thickness therebetween will not be provided in both writing state (amorphous state) and erasing state (crystalline state). Such a characteristic of the reflection film 169 can be realized using any other material as long as the imaginary part of the complex index of the reflective film 169 is large, i.e. the reflectivity thereof is high.

Figure 26:
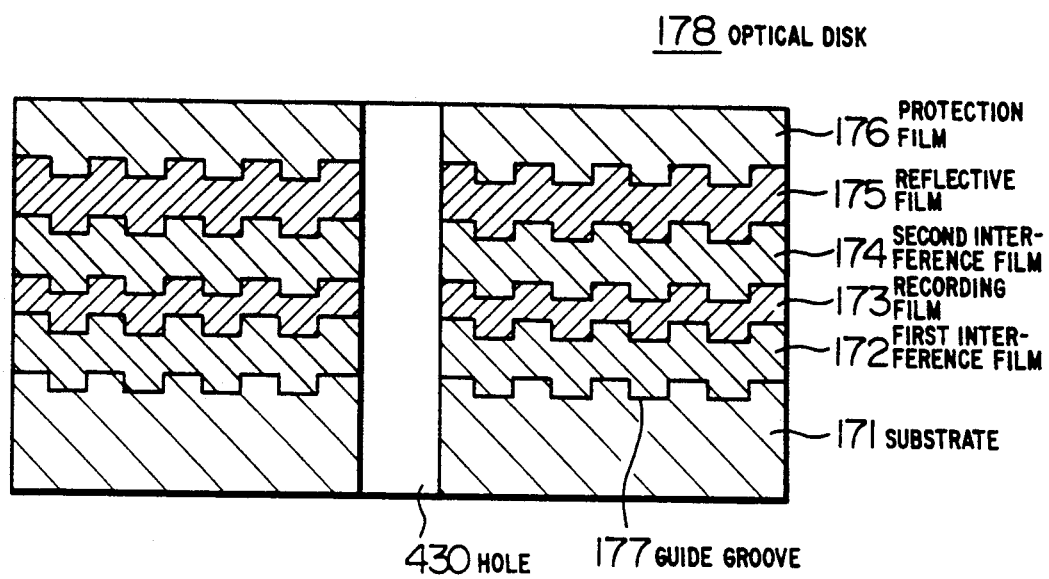
FIG. 26 is a sectional view of a fifth embodiment of a phase change optical disk according to the present invention.

FIG. 26 shows the section of a fifth embodiment 178 of an optical disk according the present invention. This fifth embodiment has the same arrangement as the optical disk 8 shown in FIG. 7. Namely, a numeral 171 is a substrate; 172 is a first interference film; 173 is a recording film; 174 is a second interference film; 175 is a reflective film; 176 is a protection film; 177 are guide grooves, and 430 is a hole. It should be noted that the reflective film is made of an alloy of Au - Cr the composition ratio of which is 90:10 (at.%) at an inner peripheral position of a radius of 30 mm and is 97:3 at an outer peripheral position of a radius of 60 mm.

The inventors of the present invention measured the reproduced signal in single beam overwrite in the same manner as in the second embodiment (FIG. 21) except that Pw and Pe are fixed to about 13 mW and about 9 mW, respectively, at both inner and outer peripheral positions. As a result, a CNR of 51 dB, an erasability of −40 dB and a crosstalk of −38 dB were provided at the inner peripheral position of a radius of 30 mm while a CNr of 52 dB, an erasability of −36 dB and a crosstalk of −36 dB were obtained at the outer peripheral position of a radius of 60 mm. It should be noted that these measurement results are better (i.e. more uniform at both peripheral positions) than the characteristics of B in FIGS. 12 to 14 although Pw and Pe are fixed at both peripheral positions. The reason for this is as follows. Now, it should be noted that Cr has a lower thermal conductivity than Au. Since the reflective film 175 is adapted to be liable to diffuse heat at an outer peripheral position than at an inner peripheral position, the volume of the heated portion (position) is made larger toward an outer peripheral position; the temperature T of the recording film 173 is suppressed at the outer peripheral position. Thus, the substantially uniform modulation degree can be obtained at both inner and outer peripheral positions.

In the case where the difference in the reflectivity of the optical disk 178 between the inner and outer peripheral positions is considerably large in both writing and erasing states owing that the reflective film 175 is made of the other material or the composition thereof greatly varies at the inner and outer peripheral positions, the distribution of substantially uniform reflectivity at both inner and outer peripheral positions can be obtained by suitably setting the thickness of the first interference film 172 or the second interference film 174 of the optical disk 178.

Figure 27:
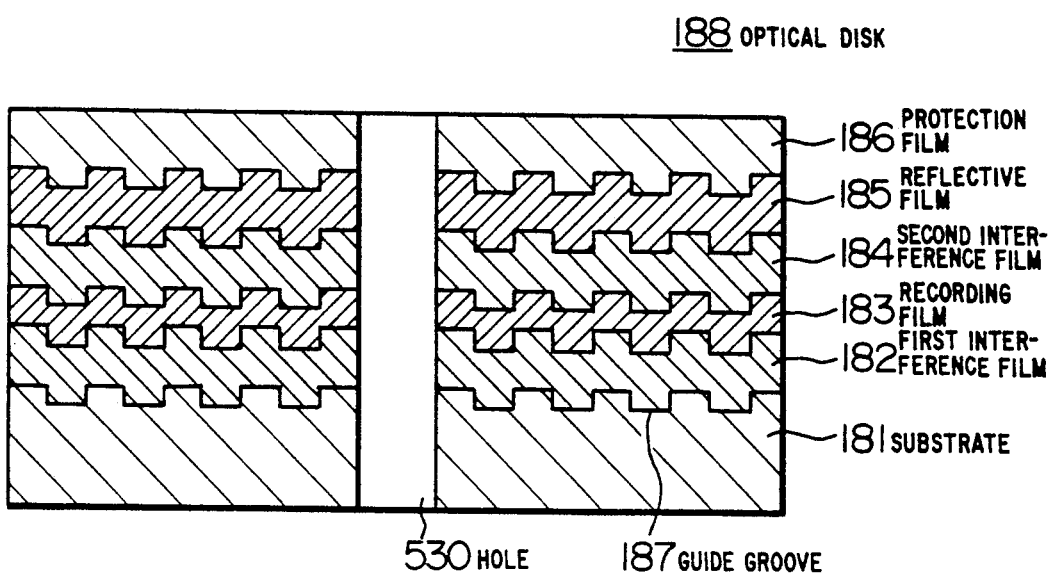
FIG. 27 is a sectional view of a sixth embodiment of a phase change optical disk according to the present invention.

FIG. 27 shows the section of a sixth embodiment of an optical disk according to the present invention. The arrangement of the optical disk 188 is the same as that shown in FIG. 7.

In FIG. 27, a numeral 181 is a disk-shape (diameter: 130 cm) glass substrate having guide grooves 187 for tracking control. Formed on the glass substrate 181 is a first interference film 182 of $Si_3N_4$ about 70 nm thick. formed on the first interference film 182 is a recording film 183 of a ternary compound of In-Sb-Te having a composition ratio of 21:36:43 (at.%); the recording film has a thickness of about 30 nm. Formed on the recording film 183 is a second interference film 184 of $(Si_3N_4) \times (SiO)_{1-x}$ ($0 \leq X \leq 1$) about 70 nm thick. Formed on the second interference film 184 is a reflective film 185 of Pt having a thickness of about 100 nm. Finally formed on the reflective film 185 is a protection film 186 of ultraviolet-setting resin. Thus, the optical disk 188 of one-side type is fabricated. It should be noted that x in $(Si_3N_4) \times (SiO)_{1-x}$ ($0 \leq X \leq 1$) which is a material is set so that $X = 0.8$ at an inner peripheral position of a radius of 30 mm and $X = 0.97$ at an outer peripheral position of a radius of 60 mm.

The inventors of the present invention measured the reproduced signal in single beam overwrite in the same manner as in the second embodiment of an optical disk with Pw and Pe fixed to about 13 mW and about 9 mW, at both inner and outer peripheral positions, respectively. As a result, a CNR of 50 dB, an erasability of −39 dB and a crosstalk of −38 dB were provided at the inner peripheral position of a radius of 30 mm while a CNR of 51 dB, an erasability of −37 dB and a crosstalk of −36 dB were obtained at the outer peripheral position of a radius of 60 mm. It should be noted that these measurement results are better (i.e. more uniform at both peripheral positions) than the characteristics of B in FIGS. 12 to 14 although Pw and Pe are fixed at both peripheral positions. The reason for this is as follows. It should be noted that SiO has a lower thermal conductivity than $Si_3N_4$. In the sixth embodiment, therefore, the thermal conductivity of the second interference film 184 arrange between the recording film 183 and the reflective film 184 is adapted to be higher at an outer peripheral position than at an inner peripheral position; the heat insulating effect due to the second interference film 184 is lower toward the outer peripheral position.

Additionally, in this embodiment, the complex index of the second interference film 184 of $(Si_3N_4) \times (SiO)_{1-x}$ is adapted to be substantially uniform at both inner and outer peripheral positions regardless of the value of x which is a real number in the range of $0 \leq x \leq 1$. On the other hand, in the case where some difference in the refractivity exists between the inner and outer peripheral positions because of using the other material, the distribution of the reflectivity of the optical disk 188 at both inner and outer peripheral positions can be small by suitably setting the thickness of the interference film 184 itself, the first interference film 182, the recording film 183 or the reflective film 185.

Figure 28:
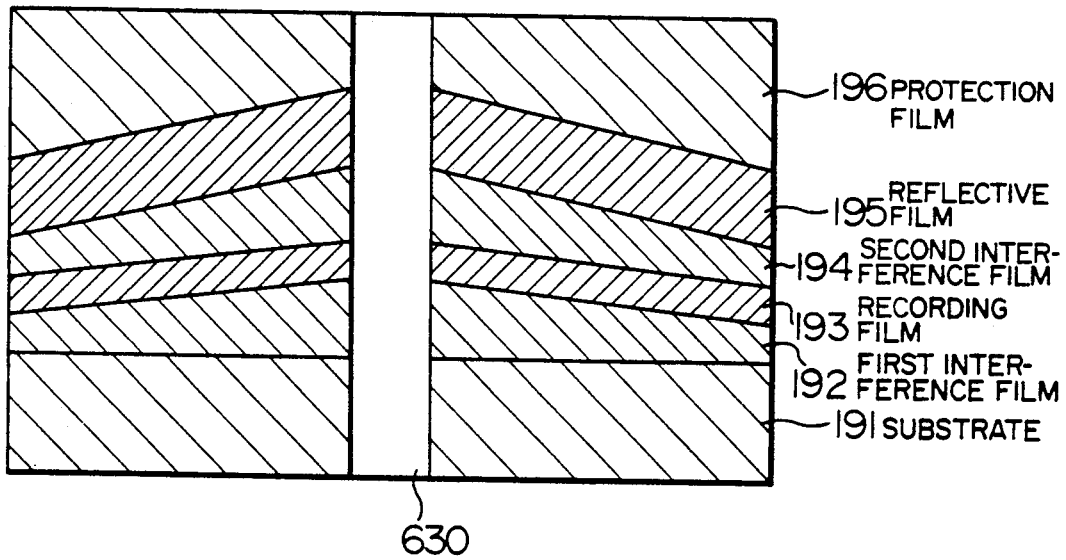
FIG. 28 is a sectional view of the seventh embodiment of a phase change optical disk according to the present invention.

FIG. 28 shows the section of a seventh embodiment 198 of an optical disk according to the present invention.

In FIG. 28, formed on a glass substrate having pits for tracking control is a first interference film 192 of $Si_3N_4$ about 30 nm thick. Formed on the first interference film 192 is a recording film 193 of a ternary compound of In-Sb-Te having a composition ratio of 21:36:43 (at.%); the recording film has a thickness of about 30 nm. Formed on the recording film 193 is a second interference film 194 of $Si_3N_4$. Formed on the second interference film 194 is a reflective film 195 of Au having a thickness of about 100 nm. Finally formed on the reflective film 195 is a protection film 196 of $Si_3N_4$. Thus, the optical disk 198 of one-side type is fabricated. A numeral 630 denotes a hole. It should be noted that both first and second interference films 192 and 194 are about 70 nm at an inner peripheral position of a radius of 30 mm and about 45 nm at an outer peripheral position of a radius of 60 mm.

The inventors of the present invention measured the reproduced signal in single beam overwrite in the same manner as in the second embodiment of an optical disk with Pw and Pe fixed to about 14 mW and about 10 mW, at both inner and outer peripheral positions, respectively. As a result, a CNR of 53 dB, an erasability of $-40$ dB and a crosstalk of $-38$ dB were provided at the inner peripheral position of a radius of 30 mm while a CNR of 52 dB, an erasability of $-36$ dB and a crosstalk of $-38$ dB were obtained at the outer peripheral position of a radius of 60 mm. It should be noted that these measurement results are better (i.e. more uniform at both peripheral positions) than the characteristics of B in FIGS. 12 to 14 although Pw and Pe are fixed at both peripheral positions. The reason for this is as follows. In the seventh embodiment, the second interference film 194 arranged between the recording film 193 and the reflective film 195 is thinner at an outer peripheral position than at an inner peripheral position so that the heat insulating effect due to the second interference film 194 is lower at the outer peripheral position; the temperature T of the recording film 193 is suppressed at the outer peripheral position. Thus, the substantially uniform modulation degree can be obtained at both inner and outer peripheral positions.

In this embodiment, the thickness of the first interference film 192 was set at the same thickness as the second interference film 194 in the seventh embodiment. This intends to correct the distribution or variation in the reflectivity of the optical disk 198 between inner and outer peripheral positions during both writing and erasing; this distribution will be created if only the thickness of the second interference film 194 is varied. This correction can be made by varying other constituent elements. For example, if the complex index of the second interference film 194 is varied in accordance with the variation in the thickness thereof, the reflectivity of the optical disk 198 can be made constant at both inner and outer peripheral positions without varying the other requirements.

The substrate in the optical disk according to the embodiments described above may be formed of any material such as glass, PMMA (polymethyl methacrylate), and PC (polycarbonate), which are commonly used as the substrate for an optical disk, as long as it is transparent. Also, either the guide grooves or the pits may be provided for tracking control.

The material of the reflective film in the optical disk in the embodiments other than the fifth embodiment (FIG. 26) should not be restricted to those adopted in them; it may be any metal commonly used as a reflective film, such as Au, Al, Ni, Cr, Fe, Co, Pt, Cu, and Ag or an alloy of these metals. In the fifth embodiment (FIG. 26), at least two kinds of metals having different thermal conductivities selected from these metals can be adopted.

Moreover, the first interference film may be made of not only $Si_3N_4$ but also dielectric such as AlN, SiO, $SiO_2$, $Ta_2O_5$, ZnS, LiNbO, and $TaNbO_3$. Additionally, this first interference film may be removed as the case may be. Conversely, the first interference film may be added in the second (FIG. 21) and fourth (FIG. 24) embodiments of an optical disk according to the present invention.

Likewise, the second interference film can be made of the same material as the first interference in the embodiments other than the sixth embodiment. In the sixth embodiment, a combination of two or more materials having different thermal conductivities may be selected from the materials mentioned above.

Furthermore, the recording film should not be restricted to compound of In-Sb-Te series, but may be compound of at least one of Sb, Ge, Zn and Sn, and at least one of Te and Se, such as Sb-Te, Ge-Sb-Te, Sb-Se, Sb-Se-Bi, Te-Se-Sb, Te-Sb-Sn, Ge-Sb-Se, Sb-Se-Zn, Sb-Se-Sn, etc.

Further, the size of the substrate and the rotation speed of the disk should not be restricted to the values adopted in the embodiments described above, but may be changed by suitably setting the components and/or composition of the recording film in accordance with the linear velocity v to be used.

Furthermore, the recording/erasing apparatus (FIGS. 10 and 18) using the phase-change optical disk according to the present invention may be used as only a recording apparatus or an erasing apparatus.

Moreover, the technique of the present invention described above may be applied to not only the phase change optical disk for single beam overwrite, but also the conventional erasable phase change optical disk using plural beams or write-once type phase change optical disk, Finally, a composite structure of FIGS. 3, 22, 24, and 28 may be adopted by changing the material, thickness or thermal conductivity of each of the recording film, the interference films, and the reflective film.

We claim:

1. A method for optically recording or erasing information for an phase change optical disk having a recording film which provides a phase change between its amorphous state and its crystalline state when it is irradiated with an applied laser beam to thereby perform at least one of recording and erasing of information, comprising the steps of:

when at least one of recording and erasing to said phase change optical disk is carried out using the same irradiation power, providing a first region of the disk set at a first linear velocity with a signal modulation degree higher than that of a second region thereof set at a second linear velocity which is lower than the first linear velocity; and applying to an inner peripheral position of the disk the laser beam with power larger than that applied to an outer peripheral position thereof for recording or erasing.

2. A method for optically recording or erasing information according to claim 1, wherein said first region is provided at least one position of the optical disk, and the power of the laser beam to be directed to the first region is smaller than a minimum value of that to be directed to said second region which is inside the first region.

3. A method for optically recording or erasing information according to claim 1, wherein said phase change optical disk is divided into at least two areas, the power of the laser beam directed to each area is set at the same level, and the power of the laser beam to be directed to the first region, which is provided at at least one position of the optical disk, is smaller than a minimum value of that to be directed to said second region which is inside said first region.

4. A method for recording or erasing information according to claim 1, wherein the power of the laser beam to be directed to the innermost peripheral position of the optical disk is smaller than that to be directed to a position outside the innermost peripheral position.

5. A method for optically recording or erasing information according to claim 1, wherein said first region is located at an outer peripheral position of said recording film and said second region is located inside said first region, said first region providing a critical cooling speed higher than a value of that of said second region.

* * * * *